(12) United States Patent
Murayama et al.

(10) Patent No.: US 10,472,766 B2
(45) Date of Patent: Nov. 12, 2019

(54) SHEET MANUFACTURING APPARATUS AND SHEET MANUFACTURING METHOD

(71) Applicant: SEIKO EPSON CORPORATION, Tokyo (JP)

(72) Inventors: Yoshiaki Murayama, Nagano (JP); Nobuhito Takahashi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 372 days.

(21) Appl. No.: 15/327,050

(22) PCT Filed: Aug. 31, 2015

(86) PCT No.: PCT/JP2015/004400
§ 371 (c)(1),
(2) Date: Jan. 18, 2017

(87) PCT Pub. No.: WO2016/035313
PCT Pub. Date: Mar. 10, 2016

(65) Prior Publication Data
US 2017/0260691 A1    Sep. 14, 2017

(30) Foreign Application Priority Data
Sep. 5, 2014 (JP) .................................. 2014-180858

(51) Int. Cl.
| | |
|---|---|
| D21B 1/08 | (2006.01) |
| B65H 1/14 | (2006.01) |
| B65H 1/28 | (2006.01) |
| D04H 1/732 | (2012.01) |
| D21B 1/10 | (2006.01) |
| D21F 9/00 | (2006.01) |
| B65H 5/24 | (2006.01) |

(Continued)

(52) U.S. Cl.
CPC .............. *D21B 1/08* (2013.01); *B65H 1/14* (2013.01); *B65H 1/28* (2013.01); *B65H 5/24* (2013.01); *B65H 5/26* (2013.01); *B65H 16/02* (2013.01); *D01G 13/00* (2013.01); *D04H 1/28* (2013.01); *D04H 1/732* (2013.01); *D21B 1/10* (2013.01); *D21F 9/00* (2013.01); *Y02W 30/644* (2015.05)

(58) Field of Classification Search
None
See application file for complete search history.

(56) References Cited

U.S. PATENT DOCUMENTS

| | | | |
|---|---|---|---|
| 3,952,124 A | 4/1976 | Mesek | |
| 4,767,586 A * | 8/1988 | Radwanski | .............. D21F 9/00 264/112 |

(Continued)

FOREIGN PATENT DOCUMENTS

| | | |
|---|---|---|
| CN | 102317539 A | 1/2012 |
| JP | 05-238590 A | 9/1993 |

(Continued)

OTHER PUBLICATIONS

The Extended European Search Report for the corresponding European Patent Application No. 15838331.5 dated Mar. 15, 2018.

*Primary Examiner* — Mary Lynn F Theisen (57) ABSTRACT

A sheet manufacturing apparatus has a manufacturing unit that makes a sheet; and a plurality of supply units that supply loaded feedstock to the manufacturing unit; and the feedstocks supplied from the plural supply units are conveyed overlapping each other.

14 Claims, 7 Drawing Sheets

(51) Int. Cl.
  *B65H 5/26*   (2006.01)
  *D04H 1/28*   (2012.01)
  *D01G 13/00*  (2006.01)
  *B65H 16/02*  (2006.01)

(56) References Cited

U.S. PATENT DOCUMENTS

| | | |
|---|---|---|
| 2007/0012414 A1 | 1/2007 | Kajander et al. |
| 2007/0045906 A1* | 3/2007 | Daniels .................... D04H 3/05 |
| | | 264/518 |
| 2009/0036012 A1 | 2/2009 | Nhan et al. |
| 2011/0297342 A1 | 12/2011 | Nordstrom |
| 2013/0299113 A1 | 11/2013 | Nordstrom |
| 2014/0374047 A1 | 12/2014 | Yamagami |
| 2016/0215422 A1* | 7/2016 | Rademacker ........ D04H 1/4242 |

FOREIGN PATENT DOCUMENTS

| | | | |
|---|---|---|---|
| JP | 2003-237981 A | 8/2003 |
| JP | 2011-157657 A | 8/2011 |
| JP | 2012-144819 A | 8/2012 |
| WO | 2004/092472 A2 | 10/2004 |
| WO | 2010/093311 A1 | 8/2010 |
| WO | 2012006338 A2 | 1/2012 |
| WO | 2013016515 A1 | 1/2013 |

* cited by examiner

SHEET MANUFACTURING APPARATUS AND SHEET MANUFACTURING METHOD

TECHNICAL FIELD

The present invention relates to a sheet manufacturing apparatus and a sheet manufacturing method.

BACKGROUND

Sheet manufacturing apparatuses for making sheets from used paper (recovered paper) as the feedstock are known from the literature. PTL 1 discloses a paper recycling apparatus that defibrates paper shreds in a dry defibrator and forms paper. The paper recycling apparatus described in PTL 1 has an automatic feeding mechanism for continuously feeding used paper to the shredder.

CITATION LIST

Patent Literature

[PTL 1] JP-A-2012-144819

SUMMARY OF INVENTION

Technical Problem

The paper recycling apparatus (sheet manufacturing apparatus) described in PTL 1, however, only has one automatic feeding mechanism (supply unit) for supplying used paper to the shredder. As a result, characteristics of the used paper that is supplied may affect the characteristics of the manufactured sheet. For example, if the page coverage (print duty) of the used paper is high, the manufactured sheet will have a grayish tone. If the used paper is paper board, the grammage of the manufactured sheet increases. If the used paper is from feedstock that has been defibrated multiple times, the strength of the manufactured sheet decreases. The characteristics of sheets manufactured by the sheet manufacturing apparatus described in PTL 1 may thus vary depending on the characteristics of the used paper that is supplied.

An objective of some aspects of the invention is to provide a sheet manufacturing apparatus that can suppress variation in the manufactured sheets. Another objective of some aspects of the invention is to provide a sheet manufacturing method that can suppress variation in the manufactured sheets.

Solution to Problem

The invention is directed to solving at least part of the foregoing problem, and can be embodied by the embodiments and examples described below.

A sheet manufacturing apparatus according to one aspect of the invention has a manufacturing unit that makes a sheet; and a plurality of supply units that supply loaded feedstock to the manufacturing unit; the sheet manufacturing apparatus conveying the feedstocks supplied from the plural supply units overlapping each other.

Because this sheet manufacturing apparatus mixes and averages characteristics when one of the overlapping feedstocks may affect the characteristics of the manufactured sheet but another feedstock does not affect the characteristics of the manufactured sheet, variation in the characteristics of the manufactured sheet can be suppressed.

A sheet manufacturing apparatus according to the invention may also have a control unit that controls supplying from the supply units so that the feedstocks partially overlap.

This sheet manufacturing apparatus can manufacture sheets with little variation in characteristics.

In a sheet manufacturing apparatus according to another aspect of the invention the plural supply units include a main supply unit that supplies used paper to the manufacturing unit, and a sub supply unit (an auxiliary supply unit) that supplies a predetermined feedstock to the manufacturing unit; and the used paper supplied from the main supply unit and the feedstock supplied from the sub supply unit are conveyed overlapping each other.

By mixing a predetermined feedstock with used paper, this sheet manufacturing apparatus can more reliably suppress variation in the characteristics of the manufactured sheet resulting from the characteristics of the used paper.

A sheet manufacturing apparatus according to another aspect of the invention may also have a control unit that supplies from the sub supply unit selectively according to the used paper.

This sheet manufacturing apparatus can reduce the frequency of use of the predetermined feedstock.

In a sheet manufacturing apparatus according to another aspect of the invention the amount of the feedstock that can be loaded in the sub supply unit may be less than the amount of used paper that can be loaded in the main supply unit.

This sheet manufacturing apparatus can reduce the amount of predetermined feedstock.

In a sheet manufacturing apparatus according to another aspect of the invention the sub supply unit may be disposed above the main supply unit.

This sheet manufacturing apparatus makes adding feedstock to the sub supply unit easier.

A sheet manufacturing method according to another aspect of the invention includes a step of conveying feedstocks supplied from plural supply units overlapping each other; and a step of manufacturing a sheet using the feedstocks.

Because this sheet manufacturing method mixes and averages feedstock characteristics when one of the overlapping feedstocks may affect the characteristics of the manufactured sheet but another feedstock does not affect the characteristics of the manufactured sheet, variation in the characteristics of the manufactured sheet can be suppressed.

A sheet manufacturing apparatus according to another aspect of the invention has a manufacturing unit that makes a sheet; and a plurality of supply units that supply feedstocks to the manufacturing unit; and the feedstocks are alternately supplied from the plural supply units.

Because this sheet manufacturing apparatus mixes and averages feedstock characteristics when the feedstock supplied from one supply unit affects the characteristics of the manufactured sheet but feedstock supplied from another supply unit does not affect the characteristics of the manufactured sheet, variation in the characteristics of the manufactured sheet can be suppressed.

A sheet manufacturing apparatus according to another aspect of the invention has a manufacturing unit that makes a sheet; and a plurality of supply units that supply feedstocks to the manufacturing unit; and supplies from another supply unit of the plural supply units while supplying from one supply unit of the plural supply units.

This sheet manufacturing apparatus can supply feedstock supplied from one supply unit and feedstock supplied from another supply unit to the manufacturing unit overlapping each other.

Further preferably in this aspect of the invention, if feedstock cannot be supplied from any one supply unit of the plural supply units, supplying feedstock from another supply unit preferably continues.

This sheet manufacturing apparatus can continue without interrupting manufacturing sheets.

DESCRIPTION OF EMBODIMENTS

Preferred embodiments of the invention are described below with reference to the accompanying figures. Note that the embodiments described below do not unduly limit the scope of the invention described in the accompanying claims. All configurations described below are also not necessarily essential elements of the invention.

1. Sheet Manufacturing Apparatus 1.1. Configuration

Figure 1:
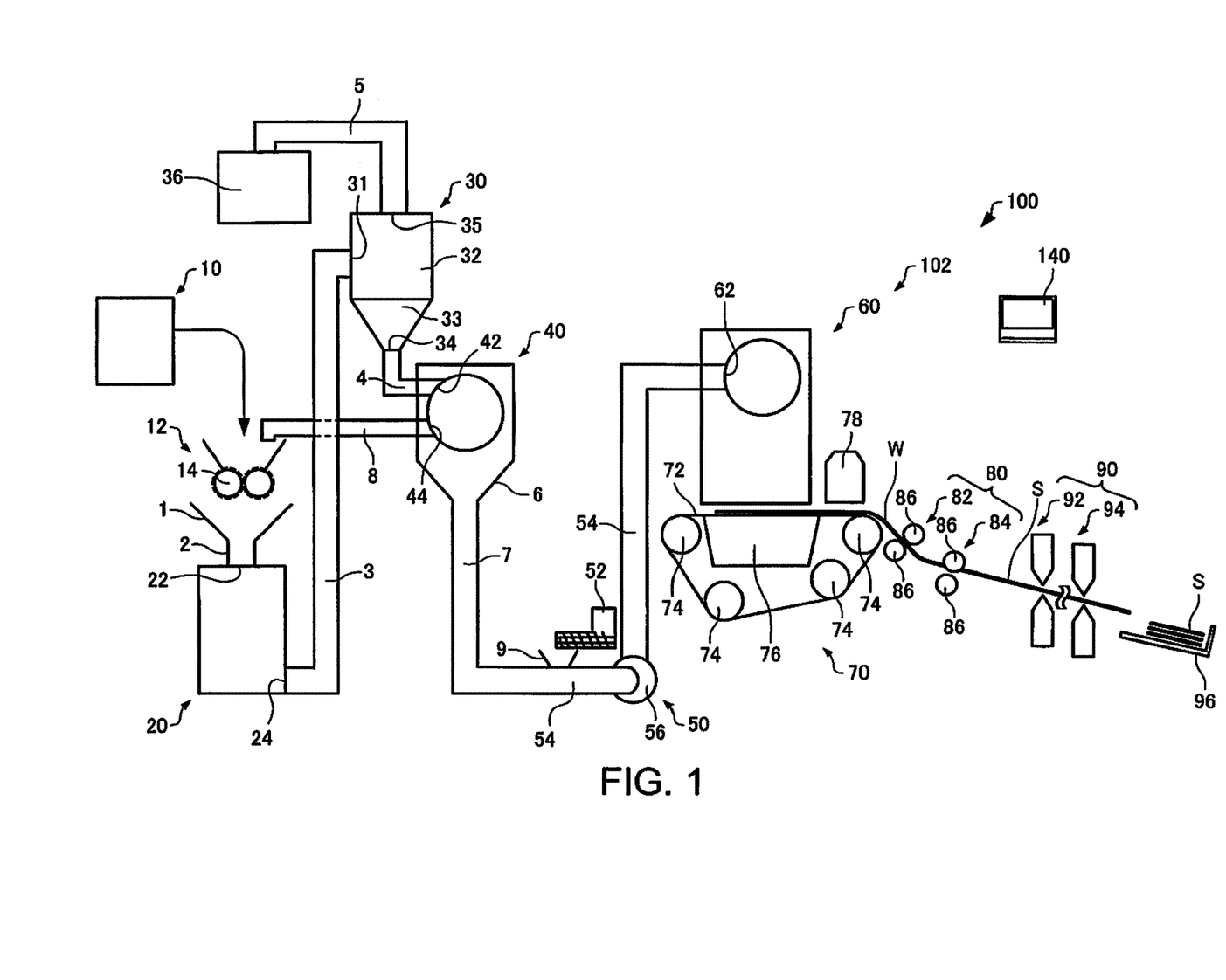
FIG. 1 schematically illustrates a sheet manufacturing apparatus according to an embodiment of the invention.

A sheet manufacturing apparatus according to this embodiment is described below with reference to the accompanying figures. FIG. 1 schematically illustrates a sheet manufacturing apparatus 100 according to this embodiment.

As shown in FIG. 1, the sheet manufacturing apparatus 100 has a supply unit 10, manufacturing unit 102, and control unit 140. The manufacturing unit 102 manufactures sheets. The manufacturing unit 102 includes a shredder 12, defibrating unit 20, classifier 30, separator 40, mixing unit 50, air-laying unit 60, web forming unit 70, sheet forming unit 80, and cutting unit 90.

The supply unit 10 supples feedstock to the shredder 12. The supply unit 10 is, for example, an automatic loader for continuously supplying feedstock material to the shredder 12.

The configuration of the supply unit 10 is described in further detail below. The sheet manufacturing apparatus 100 also has a guide unit 120 that conveys used paper, for example, supplied from the supply unit 10 to the shredder 12. A control unit 140 that controls the guide unit 120 and the supply unit 10 is described further below.

The shredder 12 cuts feedstock supplied by the supply unit 10 into shreds in air. The shreds in this example are pieces a few centimeters in size. In the example in the figure, the shredder 12 has shredder blades 14, and shreds the supplied feedstock by the shredder blades 14. In this example, a paper shredder is used as the shredder 12. The shredded material is received from the shredder 12 into a hopper 1 and carried (conveyed) to the defibrating unit 20 through a conduit 2.

The defibrating unit 20 defibrates the feedstock shredded by the shredder 12. Defibrate as used here is a process of separating feedstock (material to be defibrated) comprising interlocked fibers into individual detangled fibers. The defibrating unit 20 also functions to separate particulate such as resin, ink, toner, and sizing agents in the feedstock from the fibers.

Material that has past through the defibrating unit 20 is referred to as defibrated material. In addition to untangled fibers, the defibrated material may also contain resin particles (resin used to bind multiple fibers together), coloring agents such as ink and toner, sizing agents, paper strengthening agents, and other additives that are separated from the fibers when the fibers are detangled. The shape of the detangled defibrated material is a string or ribbon. The detangled, defibrated material may be separated from (not interlocked with) other detangled fibers, or may be in lumps interlocked with other detangled defibrated material (in so-called fiber clumps).

The defibrating unit 20 defibrates in a dry process in air (air). More specifically, an impeller mill is used as the defibrating unit 20. The defibrating unit 20 can also create an air flow that sucks in the feedstock and then discharges the defibrated material. As a result, the defibrating unit 20 can suction the feedstock with the air flow from the inlet 22, defibrate, and then convey the defibrated material to the exit 24 using the air flow produced by the defibrating unit 20. The defibrated material that past the defibrating unit 20 is conveyed through a conduit 3 to the classifier 30.

The classifier 30 classifies the defibrated material from the defibrating unit 20. More specifically, the classifier 30 separates and removes relatively small or low density material (resin particles, coloring agents, additives, for example) from the defibrated material. This increases the percentage of relatively large or high density material in the defibrated material.

An air classifying mechanism is used as the classifier 30. An air classifier produces a helical air flow that classifies material by the difference in centrifugal force resulting from the differences in the size and density of the material, and the cut point can be adjusted by adjusting the speed of the air flow and the centrifugal force. More specifically, a cyclone, elbow-jet or eddy classifier, for example, may be used as the classifier 30. A cyclone is particularly well suited as the classifier 30 because of its simple construction.

The classifier 30 has an inlet 31, a cylinder 32 connected to the inlet 31, an inverted conical section 33 located below the cylinder 32 and connected continuously to the cylinder 32, a bottom discharge port 34 disposed in the bottom center of the conical section 33, and a top discharge port 35 disposed in the top center of the cylinder 32.

In the classifier 30, the air flow carrying the defibrated material introduced from the inlet 31 changes to a circular air flow in the cylinder 32. As a result, centrifugal force is applied to defibrated material that is introduced thereto, and the classifier 30 can separate the defibrated material into fibers (first classified material) that are larger and higher in density than the resin particles and ink particles in the defibrated material, and resin particles, coloring agents, and additives (second classified material) in the defibrated material that are smaller and have lower density than the fiber in the defibrated material. The first classified material is discharged from the bottom discharge port 34, and introduced through a conduit 4 to the separator 40. The second classified material is discharged from the top discharge port 35 through another conduit 5 into a receiver 36.

The separator 40 selects fibers by length from the first classified material that past the classifier 30 and was introduced from the inlet 42. A sieve (sifter) is used as the separator 40. The separator 40 has mesh (filter, screen), and can separate fiber or particles smaller than the size of the openings in the mesh (that pass through the mesh, first selected material) from fiber, undefibrated shreds, and clumps that are larger than the openings in the mesh (that do not pass through the mesh, second selected material). For example, the first selected material is received in a hopper 6 and conveyed through a conduit 7 to the mixing unit 50. The second selected material is returned from the exit 44 through another conduit 8 to the defibrating unit 20. More specifically, the separator 40 is a cylindrical sieve that can be rotated by a motor. The mesh of the separator 40 may be a metal screen, expanded metal made by expanding a metal sheet with slits formed therein, or punched metal having holes formed by a press in a metal sheet.

The mixing unit 50 mixes an additive containing resin with first classified material that past the separator 40. The mixing unit 50 has an additive supply unit 52 that supplies additive, a conduit 54 for conveying the selected material and additive, and a blower 56. In the example in the figure, the additive is supplied from the additive supply unit 52 through a hopper 9 to a conduit 54. Conduit 54 communicates with conduit 7.

The mixing unit 50 produces an air flow with the blower 56, and can convey while mixing the selected material and additives through the conduit 54. Note that the mechanism for mixing the first selected material and additive is not specifically limited, and may mix by means of blades turning at high speed, or may use rotation of the container like a V blender.

A screw feeder such as shown in FIG. 1, or a disc feeder not shown, may be used as the additive supply unit 52. The additive supplied from the additive supply unit 52 contains resin for binding multiple fibers together. The multiple fibers are not bound when the resin is supplied. The resin melts and binds multiple fibers when passing the sheet forming unit 80.

The resin supplied from the additive supply unit 52 is a thermoplastic resin or thermoset resin, such as AS resin, ABS resin, polypropylene, polyethylene, polyvinyl chloride, polystyrene, acrylic resin, polyester resin, polyethylene terephthalate, polyethylene ether, polyphenylene ether, polybutylene terephthalate, nylon, polyimide, polycarbonate, polyacetal, polyphenylene sulfide, and polyether ether ketone. These resins may be used individually or in a desirable combination. The additive supplied from the additive supply unit 52 may be fibrous or powder.

Depending on the type of sheet being manufactured, the additive supplied from the additive supply unit 52 may also include a coloring agent for coloring the fiber, an antiblocking agent to prevent fiber agglomeration, or a flame retardant for making the fiber difficult to burn, in addition to resin for binding fibers. The mixture (a mixture of first classified material and additive) that past the mixing unit 50 is conveyed through the conduit 54 to the air-laying unit 60.

The mixture that past the mixing unit 50 is introduced from the inlet 62 to the air-laying unit 60, which detangles and disperses the tangled defibrated material (fiber) in air while the mixture precipitates. When the resin in the additive supplied from the additive supply unit 52 is fibrous, the air-laying unit 60 also detangles interlocked resin fibers. The air-laying unit 60 also works to uniformly lay the mixture in the web forming unit 70.

A cylindrical sieve that turns is used as the air-laying unit 60. The air-laying unit 60 has mesh, and causes fiber and particles smaller than the size of the mesh (that pass through the mesh) and contained in the mixture that past the mixing unit 50 to precipitate. The configuration of the air-laying unit 60 is the same as the configuration of the separator 40 in this example.

Note that the sieve of the air-laying unit 60 may be configured without the ability to select specific material. More specifically, the "sieve" used as the air-laying unit 60 means a device having mesh, and the air-laying unit 60 may cause all of the mixture introduced to the air-laying unit 60 to precipitate.

The web forming unit 70 lays the precipitate that past through the air-laying unit 60 into a web W. The web forming unit 70 includes, for example, a mesh belt 72, tension rollers 74, and a suction mechanism 76.

The mesh belt 72 is moving while precipitate that has past through the holes (mesh) of the air-laying unit 60 accumulates thereon. The mesh belt 72 is tensioned by the tension rollers 74, and is configured so that air passes through but it is difficult for the precipitate to pass through. The mesh belt 72 moves when the tension rollers 74 turn. A web W is formed on the mesh belt 72 as a result of the mixture that past the air-laying unit 60 precipitating continuously while the mesh belt 72 moves continuously. The mesh belt 72 may be metal, plastic, cloth, or nonwoven cloth.

The suction mechanism 76 is disposed below the mesh belt 72 (on the opposite side as the air-laying unit 60). The suction mechanism 76 produces a downward flow of air (air flow directed from the air-laying unit 60 to the mesh belt 72). The mixture distributed in air by the air-laying unit 60 can be pulled onto the mesh belt 72 by the suction mechanism 76. As a result, the discharge rate from the air-laying unit 60 can be increased. A downward air flow can also be created in the descent path of the mixture, and interlocking of defibrated material and additive during descent can be prevented, by the suction mechanism 76.

A soft, fluffy web W containing much air is formed by material passing through the air-laying unit 60 and web forming unit 70 (web forming process) as described above. The web W laid on the mesh belt 72 is then conveyed to the sheet forming unit 80.

Note that a moisture content adjustment unit 78 for adjusting the moisture content of the web W is disposed in the example shown in the figure. The moisture content adjustment unit 78 adds water or vapor to the web W to adjust the ratio of water to the web W.

The sheet forming unit 80 applies heat and pressure to the web W laid on the mesh belt 72, forming a sheet. By applying heat to the mixture of defibrated material and additive mixed into the web W, the sheet forming unit 80 can bind fibers in the mixture together through the additive (resin).

A heat roller (heating roller), hot press molding machine, hot plate, hot air blower, infrared heater, or flash fuser, for example, may be used in the sheet forming unit 80. In the example shown in the figure, the sheet forming unit 80 comprises a first binding unit 82 and a second binding unit 84, and the binding units 82, 84 each have a pair of heat rollers 86. By configuring the binding units 82, 84 with heat rollers 86 instead of using a flat press (flat press machine) in the binding units 82, 84, a sheet S can be formed while continuously conveying the web W. Note that the number of heat rollers 86 is not specifically limited.

The cutting unit 90 cuts the sheet S formed by the sheet forming unit 80. In the example in the figure, the cutting unit 90 has a first cutter 92 that cuts the sheet S crosswise to the conveyance direction of the sheet S, and a second cutter 94 that cuts the sheet S parallel to the conveyance direction. The second cutter 94 cuts the sheet S after passing through the first cutter 92, for example.

Cut sheets S of a specific size are formed by the process described above. The cut sheets S are then discharged to the discharge unit 96.

1.2. Supply Unit

Figure 2:
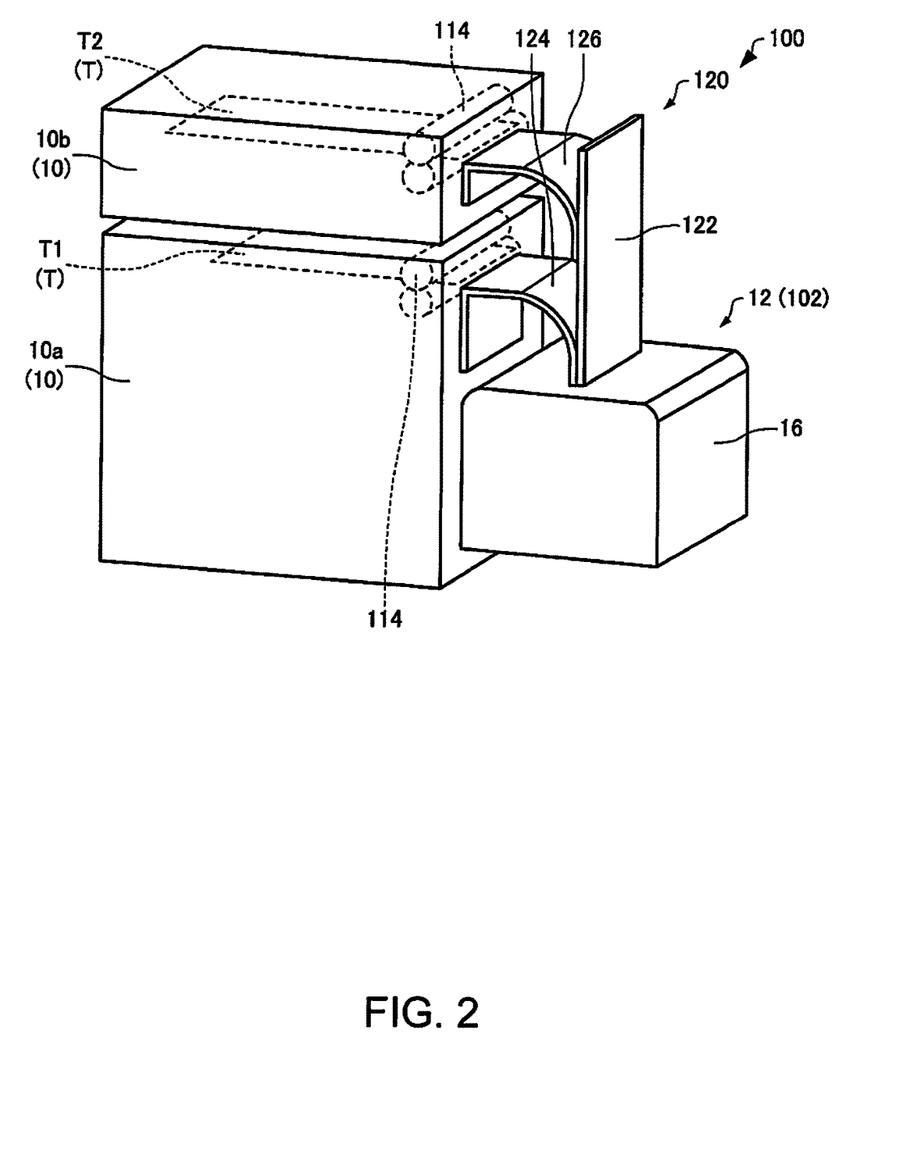
FIG. 2 is an oblique view schematically illustrating the supply unit, guide unit, and shredder of a sheet manufacturing apparatus according to an embodiment of the invention.
Figure 3:
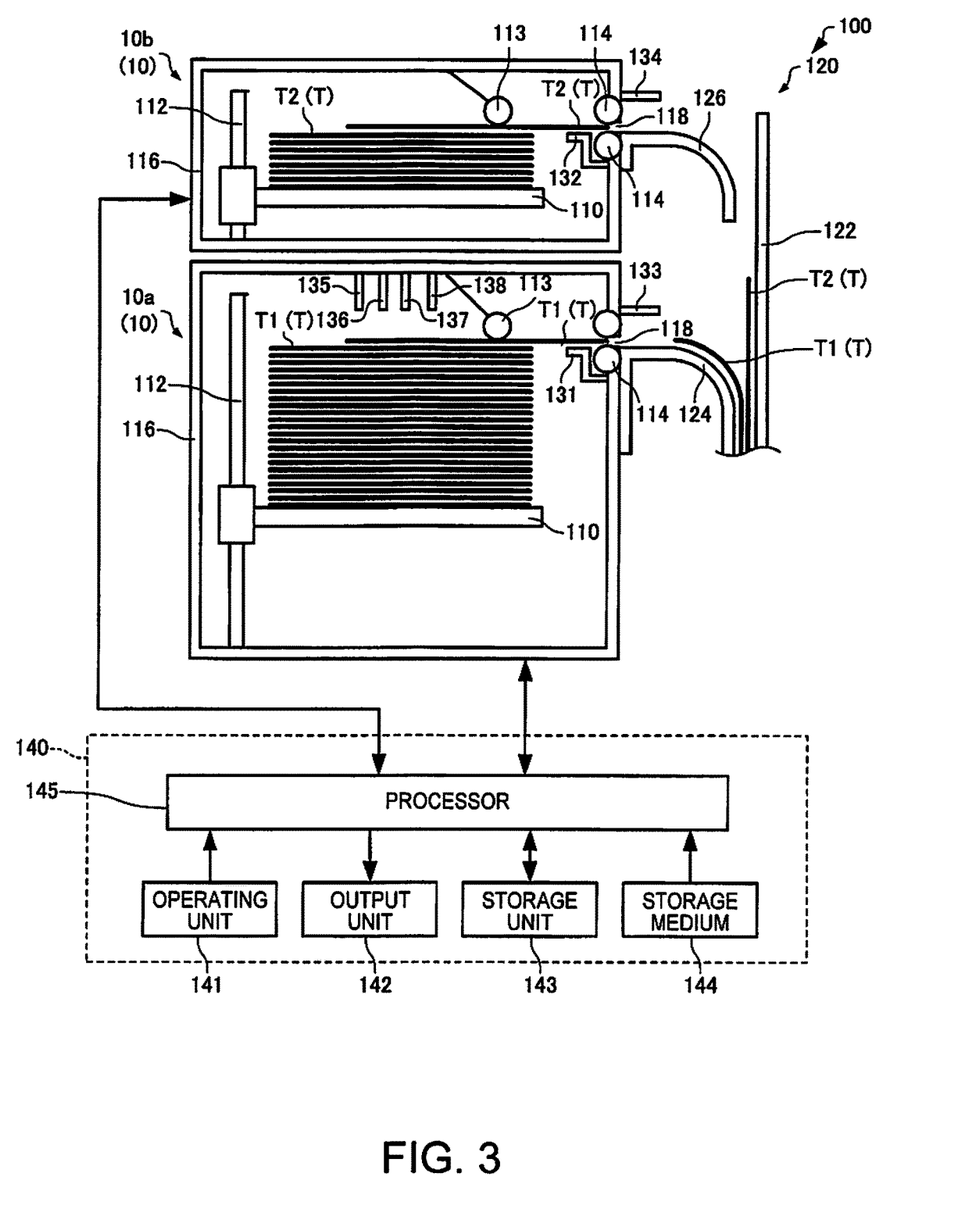
FIG. 3 is used to describe the supply unit, guide unit, and control unit of a sheet manufacturing apparatus according to an embodiment of the invention.

The supply unit 10 of the sheet manufacturing apparatus 100 is described next. FIG. 2 is an oblique view of the supply unit 10. FIG. 2 and FIG. 3 also show the guide unit 120. The shredder 12 is also shown in FIG. 2. However, FIG. 2 shows the case 16 of the shredder 12, and the shredder blades 14 (see FIG. 1) are housed inside the case 16. For illustration in FIG. 1, the case 16 is omitted and illustration of the supply unit 10 is simplified. Some of the feedstock material T is not shown in FIG. 2. A function block diagram of the control unit 140 is also shown in FIG. 3.

As shown in FIG. 2 and FIG. 3, the supply unit 10 supplies the feedstock material T loaded therein to the manufacturing unit 102. More specifically, the supply unit 10 supplies the loaded feedstock material T through the guide unit 120 to the shredder 12. The feedstock material T is material that can be supplied by the supply unit 10, such as cut-sheet paper (A4 or US letter) or roll paper. The feedstock material T is used paper or other predefined feedstock material.

Used paper as used herein is material from which recycled paper is made, such as used paper, newspaper, and magazines, and details about the properties thereof (such as the grammage, page coverage, types of additives that were used, fiber length) may be unknown to the sheet manufacturing apparatus 100. The used paper may also be sheets that were made by the sheet manufacturing apparatus 100. The predefined feedstock material is specified in the operating manual or the website of the sheet manufacturing apparatus 100, and are sheets with properties known to the sheet manufacturing apparatus 100.

As shown in FIG. 3, the supply unit 10 has a loading tray 110 inside the case 116. The feedstock material T is loaded (stacked) on the loading tray 110. A pickup roller 113 contacts the sheet of feedstock material T at the top of the stack of feedstock material T. When the pickup roller 113 turns, the top sheet of feedstock material T is conveyed to the right in FIG. 3. The conveyed feedstock material T is then conveyed by a feed roller 114 from the exit 118 opening in the case 116 to the guide unit 120. Each time one or multiple sheets of feedstock material T are conveyed by the pickup roller 113, the loading tray 110 rises. The position of the loading tray 110 can move vertically according to the elevation of the pickup roller 113. As a result, the position of the loading tray 110 is a position corresponding to the stack of feedstock material T. The position of the pickup roller 113 is substantially constant relative to the feed roller 114. In the example in the figure, the loading tray 110 is connected to a vertical drive shaft 112, and the loading tray 110 can move up or down as the vertical drive shaft 112 turns. Rotation of the vertical drive shaft 112 is driven by a motor (not shown in the figure) connected to the vertical drive shaft 112. The vertical drive shaft 112 in this example is a lead screw.

Note that the configuration of the supply unit 10 is not specifically limited insofar as it can supply the loaded feedstock material T to the manufacturing unit 102. For example, a spring that urges the loading tray 110 toward the pickup roller 113 may be used instead of a vertical drive shaft 112. The numbers of rollers 113 and 114 is also not specifically limited.

There are multiple supply units 10. There are two supply units 10 in the example in FIG. 2, but the number is not specifically limited. For example, of the plural supply units 10, one supply unit 10 is the main supply unit 10a, and the other supply unit 10 is a sub supply unit (an auxiliary supply unit) 10b. More specifically, the plural supply units 10 include a main supply unit 10a and a sub supply unit (an auxiliary supply unit) 10b. The main supply unit 10a is the supply unit that supplies used paper T1 to the shredder 12. The sub supply unit 10b is the supply unit that supplies predetermined feedstock T2 to the shredder 12.

The feedstock T2 supplied from the sub supply unit 10b preferably has greater whiteness than the used paper T1. This enables manufacturing a sheet S with greater whiteness than if only used paper T1 is supplied to the shredder 12. The fiber length of the feedstock T2 is preferably longer than the fiber length of the used paper T1. The fiber length of the used paper T1 may become shorter through repeated defibration. As a result, a sheet S with high strength can be made by supplying feedstock T2 with a long fiber length. The grammage of the feedstock T2 is preferably the target grammage (the intended grammage of the sheet S manufactured by the sheet manufacturing apparatus 100). As a result, the grammage of the sheet S manufactured by the sheet manufacturing apparatus 100 will be closer to the target grammage. Foreign matter (impurities other than fiber) is preferably not contained in the feedstock T2 (or the amount of foreign matter is less than in the used paper T1). As a result, the percentage of foreign matter contained in the sheet S made by the sheet manufacturing apparatus 100 can be reduced. The feedstock T2 may also be smaller in size and thickness than common paper sizes so that it can be purchased at a lower cost.

The sub supply unit 10b is disposed above the main supply unit 10a. The distance between the sub supply unit 10b and shredder 12 is greater than the distance between the main supply unit 10a and the shredder 12. In the example in the figure, the main supply unit 10a is in contact with the shredder 12, and the sub supply unit 10b is separated from the shredder 12.

The amount (volume) of feedstock T2 that can be loaded in the sub supply unit 10b is less than the amount (volume) of used paper T1 that can be loaded in the main supply unit 10a. The amount of feedstock material T (used paper T1 or feedstock T2) that can be loaded in the supply unit is the total amount of feedstock material T that is loaded when the loading tray 110 is at the lowest position and the feedstock material T can be supplied. The amount of feedstock material T that can be loaded is described in the catalog or operating manual of the sheet manufacturing apparatus 100, for example. In the example in the figure, the height of the sub supply unit 10b is less than the height of the main supply unit 10a, and the capacity of the case 116 of the sub supply unit 10b is less than the capacity of the case 116 of the main supply unit 10a. Note that the sub supply unit 10b is smaller than the main supply unit 10a in the dimension in the conveyance direction of the feedstock T2 and the dimension crosswise to the conveyance direction.

Note that the feedstock material T may vary in density and grammage. As a result, the amount of feedstock material T that can be loaded in the supply unit 10 differs according to feedstock material T that is loaded.

The guide unit 120 simultaneously conveys feedstock material T supplied from plural supply units 10. More specifically, the guide unit 120 supplies used paper T1 supplied from the main supply unit 10a overlapping the feedstock T2 supplied from the sub supply unit 10b to the shredder 12. The guide unit 120 may be made of metal or plastic, for example.

The guide unit 120 comprises, for example, a flat panel 122 connected to the shredder 12, a first guide 124 that guides used paper T1 to the flat panel 122, and a second guide 126 that guides feedstock T2 to the flat panel 122. The first guide 124 connects to the case 116 of the main supply unit 10a. The second guide 126 connects to the case 116 of the sub supply unit 10b. In the example in the figures, the flat panel 122 is separated from the guides 124, 126, and part of the used paper T1 and part of the feedstock T2 overlap between the flat panel 122 and the first guide 124. Note that the guide unit 120 may be configured in any way enabling conveying overlapping feedstock material T supplied from plural supply units 10.

The sheet manufacturing apparatus 100 also has sensors 131, 132, 133, 134, 135, 136, 137, 138.

The first sensor 131 is disposed inside the case 116 of the main supply unit 10a. The second sensor 132 is disposed inside the case 116 of the sub supply unit 10b. Sensors 131, 132 can detect if there is feedstock material T on the loading tray 110. The type and locations of the sensors 131, 132 are not specifically limited insofar as they can detect whether or not feedstock material T is on the loading tray 110.

The third sensor 133 is disposed on the outside of the case 116 near the exit 118 of the main supply unit 10a. The fourth sensor 134 is disposed on the outside of the case 116 near the exit 118 of the sub supply unit 10b. Sensors 133, 134 can detect if feedstock material T was supplied from the supply unit 10 (was discharged from the exit 118). The type and locations of the sensors 133, 134 are not specifically limited insofar as they can detect whether or not feedstock material T was supplied from the supply unit 10. Note that sensors 133, 134 are not shown in FIG. 2.

The fifth sensor 135, sixth sensor 136, seventh sensor 137, and eighth sensor 138 are disposed inside the case 116 of the main supply unit 10a. Sensors 135, 136, 137, 138 can detect properties of the used paper T1. The fifth sensor 135 is a scanner, for example, and can detect the whiteness of the used paper T1. The sixth sensor 136 is a scanner, for example, and can detect marks on the used paper T1 (marks imparted by the marking unit 98 shown in FIG. 1). How many times the used paper T1 has been recycled can be known from the detected marks on the used paper T1, and the fiber length of the used paper T1 can be estimated from the number of times the used paper T1 has been recycled. Information related to the fiber length and the number of times the used paper T1 has been recycled may be stored in a storage unit 143 of the control unit 140. The seventh sensor 137 is, for example, a grammage sensor, and can detect the grammage of the used paper T1. The eighth sensor 138 is a scanner, for example, and can detect if there is foreign matter (foreign particles and other impurities) in the used paper T1.

A flow meter (not shown in the figure) is disposed to the conduit 8 (see FIG. 1), and the fiber length of the used paper T1 may be estimated from the flow detected by the flow meter. While not shown in the figures, sensors 135, 136 and sensor 138 may be combined as a single sensor. While also not shown in the figures, the type and locations of sensors 135, 136, 137, 138 are not specifically limited insofar as properties of the used paper T1 can be detected. At least one or all four sensors 135, 136, 137, 138 may also be used.

1.3. Control Unit

As shown in FIG. 3, the control unit 140 includes an operating unit 141, output unit 142, storage unit 143, storage medium 144, and processor 145.

The operating unit 141 executes a process of acquiring operating signals corresponding to user operations and sending signals to the processor 145. The operating unit 141 may be a button, key, touch panel display, or microphone, for example.

Based on a signal input from the processor 145, the output unit 142 displays the process result from the processor 145, for example. The output unit 142 displays the process result of the processor 145 as text, for example. The output unit 142 may be an LCD (Liquid Crystal Display), CRT (Cathode Ray Tube), or touch panel display, for example. The output unit 142 may also output the process result of the processor 145 by sound.

The storage unit 143 stores programs and data used by the processor 145 to execute various control processes. The storage unit 143 is also used as working memory for the processor 145, and temporarily stores operating signals input from the operating unit 141, programs and data read from the storage medium 144, and the results of programs executed by the processor 145.

The storage medium 144 is a computer-readable storage medium that stores application programs and data. The programs may be distributed to the storage medium 144 (storage unit 143) through a network from the data storage medium of a host device (server). The storage medium 144 may also function as a storage unit that stores data generated by processes of the processor 145 that requires long-term storage. The storage medium 144 may be an optical disc (CD, DVD), magneto-optical disk (MO), magnetic disk, hard disk drive, magnetic tape, or semiconductor memory (such as ROM, flash memory).

The processor 145 executes control processes according to programs stored in storage unit 143 or programs stored in storage medium 144. The processor 145 executes, for example, a first control process, second control process, or third control process described below. The function of the processor 145 is embodied by a program and hardware such as a processor (CPU, DSP, for example) and ASIC (gate array, for example). Note that at least part of the processor 145 may be embodied in hardware (application-specific circuit).

1.3.1. First Control Process

Figure 4:
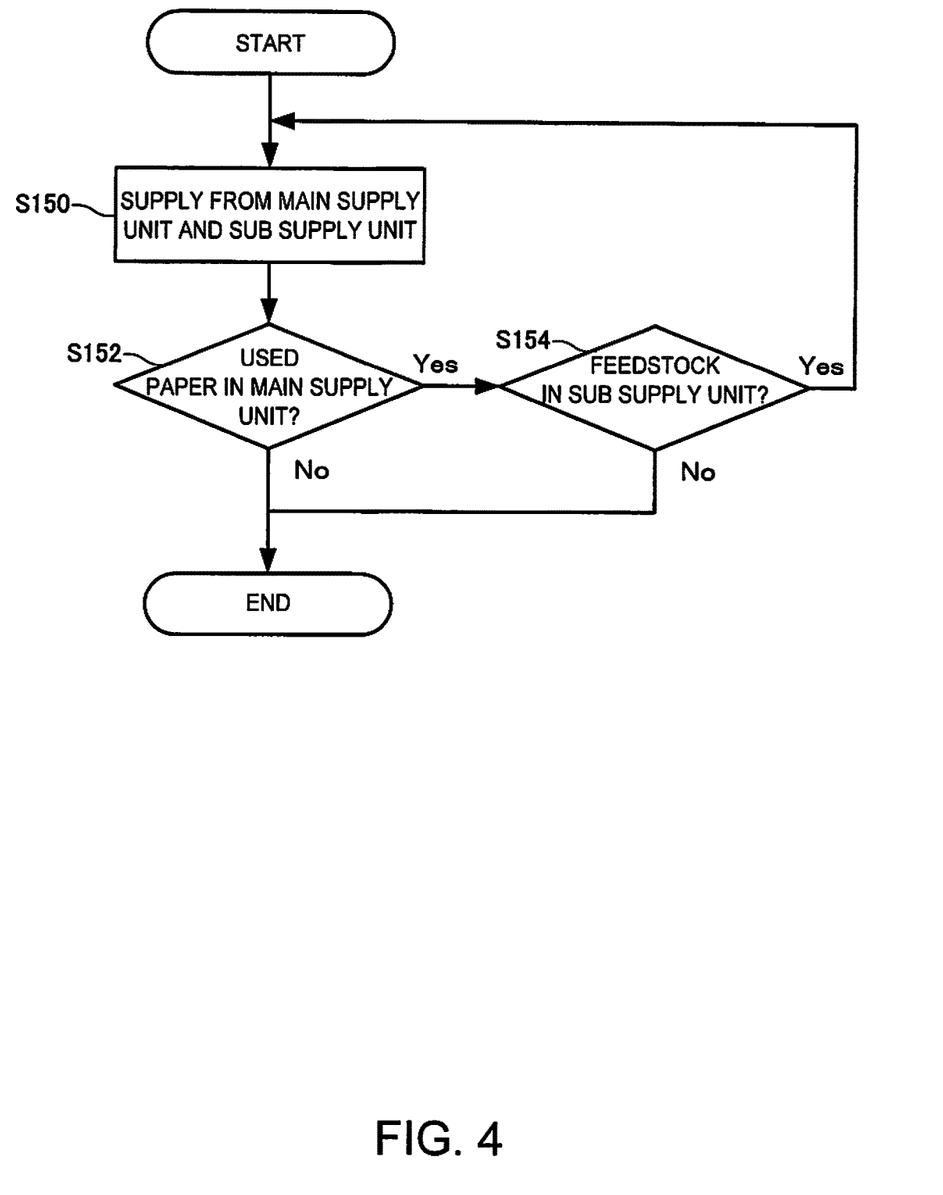
FIG. 4 is a flow chart describing a first control process of the control unit of a sheet manufacturing apparatus according to an embodiment of the invention.

The first control process is described first. FIG. 4 is a flow chart used to described the first control process of the control unit 140.

When the user requests a process for manufacturing a sheet S through the operating unit 141, for example, the processor 145 receives the operating signal from the operating unit 141 and starts the process.

When the operating signal is received from the operating unit 141, the processor 145 first controls the supply units 10a, 10b to supply feedstock material T (step S150). More specifically, the processor 145 receives the operating signal from the operating unit 141, outputs to the main supply unit 10a a signal (first signal) for driving the motor connected to the vertical drive shaft 112 and the rollers 113, 114 of the main supply unit 10a, and outputs to the sub supply unit 10b a second signal for driving the motor connected to the vertical drive shaft 112 and the rollers 113, 114 of the sub supply unit 10*b*. The first signal and second signal are signals for supplying one sheet of used paper T1 and feedstock T2, respectively. The processor 145 receives the operating signal from the operating unit 141, and after outputting the first signal and second signal once, stops outputting the first signal and second signal.

The processor 145 controls the supply units 10*a*, 10*b* so that the sheets of feedstock material T are supplied overlapping each other at least in part. More specifically, the processor 145 outputs the first signal and second signal to the main supply unit 10*a* and sub supply unit 10*b*, respectively, so that the used paper T1 supplied from the main supply unit 10*a* and the feedstock T2 supplied from the sub supply unit 10*b* overlap each other in the guide unit 120. In response to the first signal and second signal, the supply units 10*a*, 10*b* supply feedstock material T to the guide unit 120, the guide unit 120 conveys the feedstock material T supplied from the plural supply units 10 overlapping, and the guide unit 120 can manufacture a sheet S using the supplied feedstock material T.

The processor 145 then determines if there is used paper T1 in the loading tray 110 of the main supply unit 10*a* (if used paper T1 is stocked) (step S152). More specifically, the processor 145 determines whether or not there is any used paper T1 based on the signal from the first sensor 131 disposed to the main supply unit 10*a*.

If the processor 145 determines there is no used paper T1 (step S152: No), the processor 145 outputs to the output unit 142 a signal indicating there is no used paper T1 in the main supply unit 10*a*, and ends the process. The user may then load used paper T1 into the main supply unit 10*a*.

If the processor 145 determines there is used paper T1 (step S152: Yes), the processor 145 determines if there is feedstock T2 in the loading tray 110 of the sub supply unit 10*b* (step S154). More specifically, the processor 145 determines whether or not there is any feedstock T2 based on information from the second sensor 132 disposed to the sub supply unit 10*b*.

If the processor 145 determines there is no feedstock T2 (step S154: No), the processor 145 outputs to the output unit 142 a signal indicating there is no feedstock T2 in the sub supply unit 10*b*, and ends the process. The user may then load feedstock T2 into the sub supply unit 10*b*.

If the processor 145 determines there is feedstock T2 (step S154: Yes), the processor 145 again controls the supply units 10*a*, 10*b* to respectively supply used paper T1 and feedstock T2 (step S150). By means of this control process, the sheet manufacturing apparatus 100 can overlay and convey feedstock material T supplied from plural supply units 10, and manufacture a sheet S from the feedstock material T.

Note that the sequence of step S152 and step S154 is not specifically limited. For example, step S152 and step S154 may run simultaneously.

Furthermore, because the first control process does not use sensors 133, 134, 135, 136, 137, 138, these sensors may be omitted.

1.3.2. Second Control Process

Figure 5:
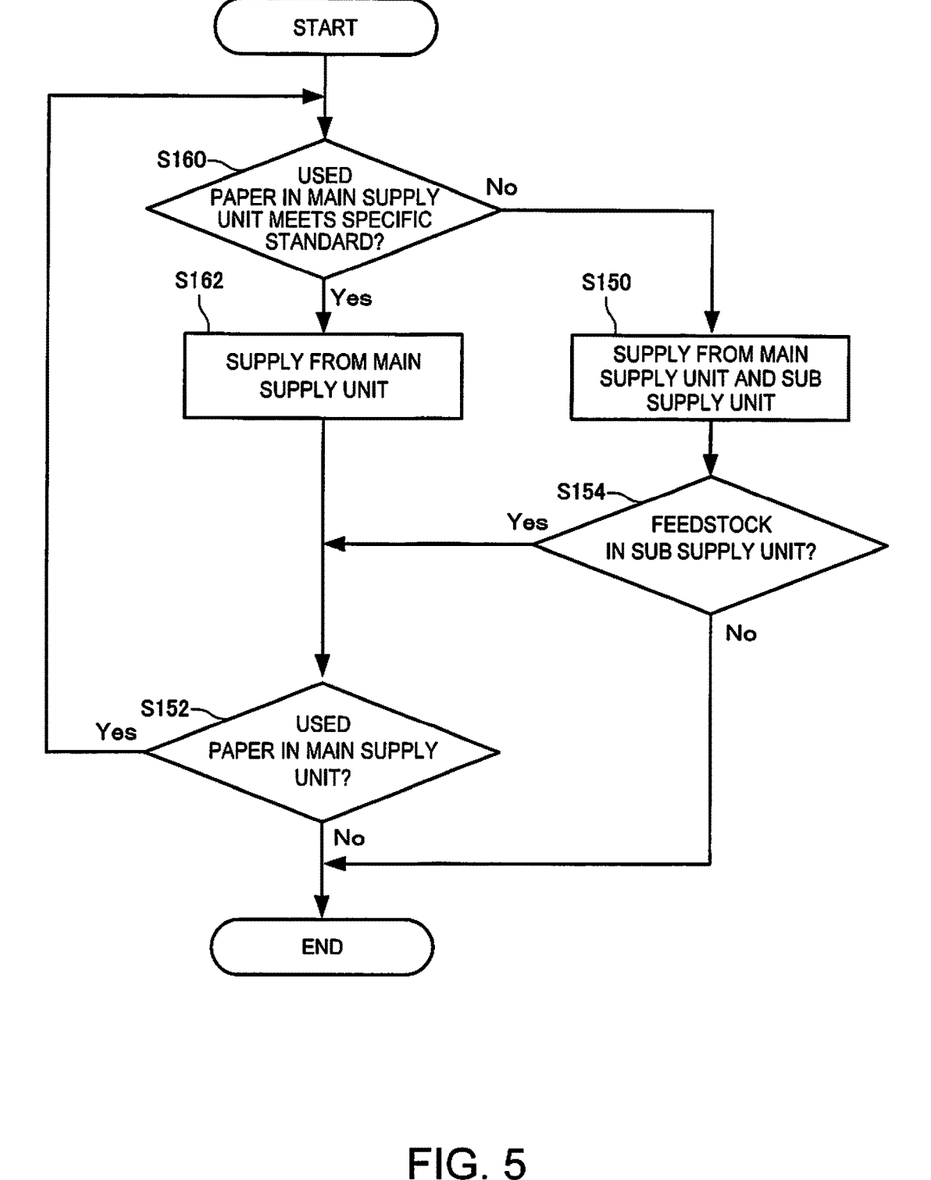
FIG. 5 is a flow chart describing a second control process of the control unit of a sheet manufacturing apparatus according to an embodiment of the invention.

A second control process is described next. FIG. 5 is a flow chart describing a second control process of the control unit 140. How the second control process differs from the foregoing first control process is described below, and further description of similarities is omitted.

When the user requests a process for manufacturing a sheet S through the operating unit 141, for example, the processor 145 receives the operating signal from the operating unit 141 and starts the process.

When the operating signal is received from the operating unit 141, the processor 145 first determines if the used paper T1 loaded in the loading tray 110 of the main supply unit 10*a* meets a specific standard (step S160). More specifically, based on a signal from the fifth sensor 135, the processor 145 acquires the whiteness of the used paper T1, and determines if the whiteness of the used paper T1 is within a specific standard. Based on a signal from the sixth sensor 136, the processor 145 also determines the fiber length of the used paper T1, and determines if the fiber length of the used paper T1 is within a specific standard. Based on a signal from the seventh sensor 137, the processor 145 also acquires the grammage of the used paper T1, and determines if the grammage of the used paper T1 is within a specific standard. Based on a signal from the eighth sensor 138, the processor 145 also acquires the amount of foreign matter in the used paper T1, and determines if the amount of foreign matter in the used paper T1 is within a specific standard.

The processor 145 determines the used paper T1 is within the specific standard if the whiteness, fiber length, grammage, and amount of foreign matter of the used paper T1 are all within the specific standards, and determines the used paper T1 does not meet the specific standard if any one of these parameters does not meet the standard. The standards for the whiteness, fiber length, grammage, and amount of foreign matter are previously stored in the storage unit 143, and the processor 145 reads the whiteness and other parameter values stored in the storage unit 143, and compares these with the whiteness and other values acquired from the used paper T1 to make decisions.

If the processor 145 determines the used paper T1 is within the specific standard (step S160: Yes), the processor 145 supplies used paper T1 from the main supply unit 10*a* (step S162).

If the processor 145 determines the used paper T1 does not meet the specific standard (step S160: No), the processor 145 supplies used paper T1 and feedstock T2 from the main supply unit 10*a* and sub supply unit 10*b* (step S150).

As described above, the second control process can selectively supply feedstock from the sub supply unit 10*b* appropriately to properties (such as whiteness, fiber length, grammage, and amount of foreign matter) of the used paper T1. More specifically, if the used paper T1 is within the specific standard, feedstock T2 is not supplied from the sub supply unit 10*b*, and feedstock T2 is supplied from the sub supply unit 10*b* only if the used paper T1 does not meet the specific standard. The frequency of using feedstock T2 can therefore be reduced.

Note that while not shown in the figures, the sheet manufacturing apparatus 100 may have multiple sub supply units 10*b*. For example, the sheet manufacturing apparatus 100 may have a first sub supply unit (a first auxiliary supply unit) 10*b* holding feedstock T2 with greater whiteness than the used paper T1, a second sub supply unit (a second auxiliary supply unit) 10*b* holding feedstock T2 with a greater fiber length than the used paper T1, a third sub supply unit (a third auxiliary supply unit) 10*b* holding feedstock T2 with less grammage than the used paper T1, a fourth sub supply unit (a fourth auxiliary supply unit) 10*b* holding feedstock T2 with greater grammage than the used paper T1, and a fifth sub supply unit (a fifth auxiliary supply unit) 10*b* holding feedstock T2 with less foreign matter than the used paper T1. The processor 145 may then supply feedstock T2 from any one of the five sub supply units 10*b* according to the properties of the used paper T1.

For example, if the grammage of the used paper T1 is determined to be lower than the specific standard, the processor 145 outputs a signal for supplying from the fourth sub supply unit 10b. If the amount of foreign matter in the used paper T1 exceeds the specific standard, the processor 145 outputs a signal for supplying from the fifth sub supply unit 10b. Coated paper and other types of used paper T1 having a non-fiber layer contain more foreign matter.

Because the second control process does not use sensors 133, 134, these may be omitted.

1.3.3. Third Control Process

Figure 6:
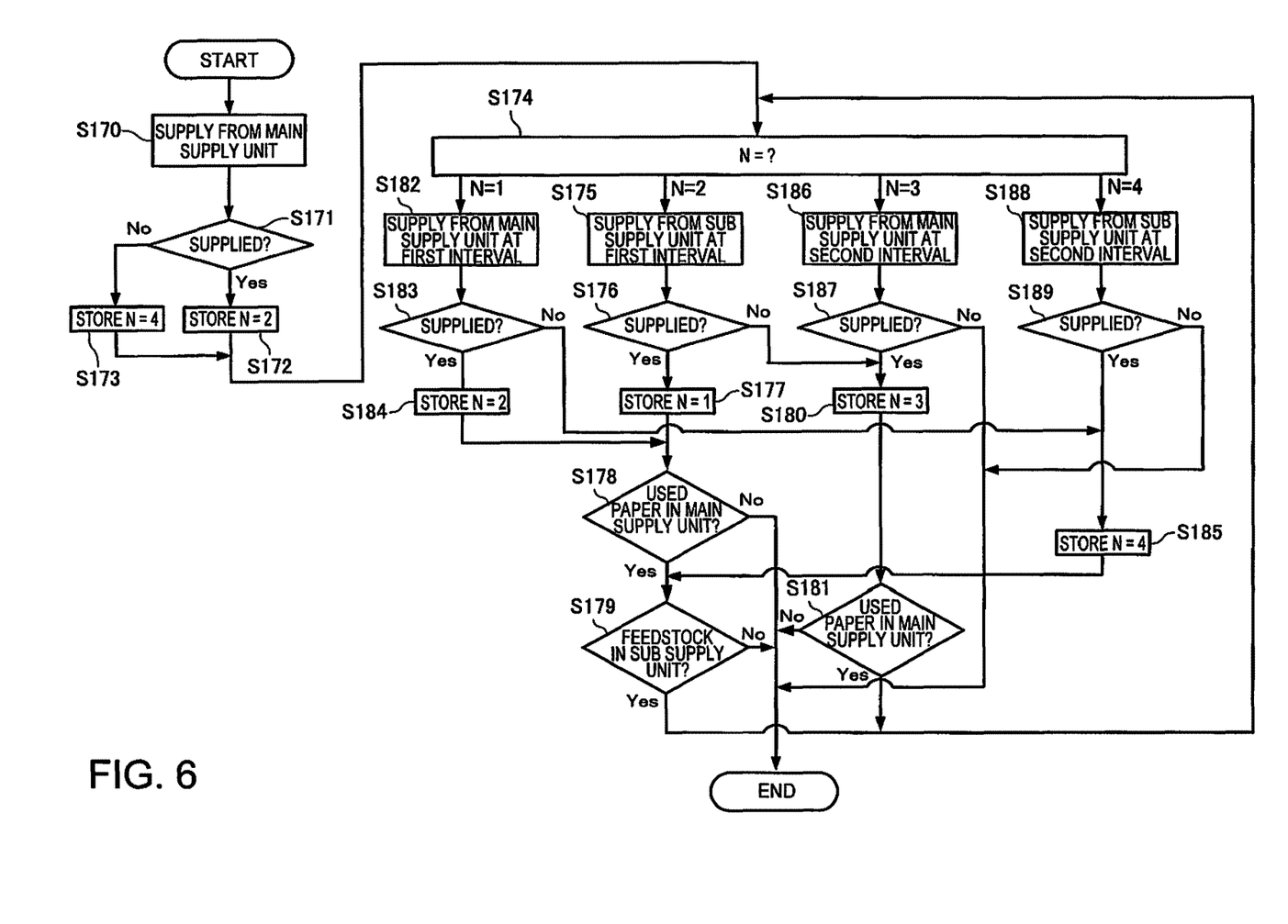
FIG. 6 is a flow chart describing a third control process of the control unit of a sheet manufacturing apparatus according to an embodiment of the invention.

A third control process is described next. FIG. 6 is a flow chart describing a third control process of the control unit 140. How the third control process differs from the foregoing first and second control processes is described below, and further description of similarities is omitted.

When the user requests a process for manufacturing a sheet S through the operating unit 141, for example, the processor 145 receives the operating signal from the operating unit 141 and starts the process.

When the operating signal is received from the operating unit 141, the processor 145 first supplies used paper T1 from the main supply unit 10a (step S170). More specifically, the processor 145 receives the operating signal from the operating unit 141, outputs to the main supply unit 10a a signal (third signal) for driving the motor connected to the vertical drive shaft 112 and the rollers 113, 114 of the main supply unit 10a.

The processor 145 then determines if the main supply unit 10a was able to supply used paper T1 (step S171). More specifically, the processor 145 determines based on the third sensor 133 whether or not used paper T1 was discharged from the exit 118.

If the processor 145 determines used paper T1 was supplied (step S171: Yes), the processor 145 stores a value of N=2 in the storage unit 143 (step S172).

If the processor 145 determines used paper T1 was not supplied (step S171: No), the processor 145 stores a value of N=4 in the storage unit 143 (step S173).

The processor 145 then reads the value of N stored in the storage unit 143 (step S174).

1.3.3.1. If N=2

If the value of N read in step S174 is 2, the processor 145 supplies feedstock T2 from the sub supply unit 10b at a first interval (step S175). More specifically, the processor 145 outputs to the sub supply unit 10b a signal for driving the motor connected to the vertical drive shaft 112 and the rollers 113, 114 of the sub supply unit 10b.

The processor 145 then determines if the sub supply unit 10b was able to supply feedstock T2 (step S176). More specifically, the processor 145 determines whether or not feedstock T2 was discharged from the exit 118 based on the fourth sensor 134.

If the processor 145 determines feedstock T2 was supplied (step S176: Yes), the processor 145 overwrites the value of N and stores N=1 in the storage unit 143 (step S177).

Next, the processor 145 determines based on the first sensor 131 if there is used paper T1 in the loading tray 110 of the main supply unit 10a (step S178).

If the processor 145 determines there is no used paper T1 (step S178: No), the processor 145 outputs to the output unit 142 a signal for indicating there is no used paper T1 in the main supply unit 10a, and ends the process.

If the processor 145 determines there is used paper T1 (step S178: Yes), the processor 145 determines based on the second sensor 132 whether or not there is feedstock T2 (feedstock material T) in the loading tray 110 of the sub supply unit 10b (step S179).

If the processor 145 determines there is no feedstock T2 (step S179: No), the processor 145 outputs to the output unit 142 a signal indicating there is no feedstock T2 in the sub supply unit 10b, for example, and ends the process.

If the processor 145 determines feedstock T2 is loaded (step S179: Yes), the processor 145 again reads the value of N stored in the storage unit 143 (step S174).

If the processor 145 determines feedstock T2 could not be supplied (step S176: No), the processor 145 overwrites the value of N and stores N=3 in the storage unit 143 (step S180).

Next, based on the first sensor 131, the processor 145 determines if used paper T1 is in the loading tray 110 of the main supply unit 10a (step S181).

If the processor 145 determines there is no used paper T1 (step S181: No), the processor 145 outputs to the output unit 142 a signal for indicating there is no used paper T1 in the main supply unit 10a, and ends the process.

If the processor 145 determines there is used paper T1 (step S181: Yes), the processor 145 again reads the value of N stored in the storage unit 143 (step S174).

1.3.3.2. If N=1

If the value of N read in step S174 is 1, the processor 145 supplies used paper T1 from the main supply unit 10a at a first interval (step S182). More specifically, the processor 145 outputs the third signal described above to the main supply unit 10a.

The processor 145 then determines if the main supply unit 10a was able to supply used paper T1 (step S183). More specifically, the processor 145 determines whether or not used paper T1 was discharged from the exit 118 based on the third sensor 133.

If the processor 145 determines used paper T1 was supplied (step S183: Yes), the processor 145 overwrites the value of N and stores N=2 in the storage unit 143 (step S184).

Next, the processor 145 determines based on the first sensor 131 if there is used paper T1 in the loading tray 110 of the main supply unit 10a (step S178).

If the processor 145 determines used paper T1 could not be supplied (step S183: No), the processor 145 overwrites the value of N and stores N=4 in the storage unit 143 (step S185).

Next, the processor 145 determines based on the second sensor 132 whether or not there is feedstock T2 in the loading tray 110 of the sub supply unit 10b (step S179).

As described above, used paper T1 and feedstock T2 are alternately supplied by repeating the route of N=1 and the route of N=2. Note that supplying feedstock material T from one supply unit 10 and supplying feedstock material T from another supply unit 10 may alternate at a specific unit (such as every sheet or every two sheets). Supply may also alternate at different units. For example, a first amount (such as five sheets) of feedstock material T may be supplied from one supply unit T, and a second amount (such as one sheet) of feedstock material T may be supplied from another supply unit 10.

If either the main supply unit 10a or sub supply unit 10b runs out of feedstock material T, supply may also continue using the supply unit 10 in which there is still feedstock material T. This case is described below.

1.3.3.3. If N=3

If the value of N read in step S174 is 3, the processor 145 supplies used paper T1 from the main supply unit 10a at a second interval (step S186). More specifically, the processor 145 outputs to the main supply unit 10a a signal for driving the motor connected to the vertical drive shaft 112 and the rollers 113, 114 of the main supply unit 10a.

The processor 145 then determines if the main supply unit 10a was able to supply used paper T1 (step S187). More specifically, the processor 145 determines whether or not used paper T1 was discharged from the exit 118 based on the third sensor 133.

If the processor 145 determines used paper T1 was supplied (step S187: Yes), the processor 145 overwrites the value of N and stores N=3 in the storage unit 143 (step S180). This results in repeating supplying from the main supply unit 10a.

If the processor 145 determines used paper T1 could not be supplied (step S187: No), the processor 145 outputs to the output unit 142 a signal for indicating the main supply unit 10a was unable to supply feedstock, for example, and ends the process.

1.3.3.4. If N=4

If the value of N read in step S174 is 4, the processor 145 supplies feedstock T2 from the sub supply unit 10b at the second interval (step S188). More specifically, the processor 145 outputs to the sub supply unit 10b a signal for driving the motor connected to the vertical drive shaft 112 and the rollers 113, 114 of the sub supply unit 10b.

The processor 145 then determines if the sub supply unit 10b was able to supply feedstock T2 (step S189). More specifically, the processor 145 determines whether or not feedstock T2 was discharged from the exit 118 based on the fourth sensor 134.

If the processor 145 determines feedstock T2 was supplied (step S189: Yes), the processor 145 overwrites the value of N and stores N=4 in the storage unit 143 (step S185). This results in repeating supplying from the sub supply unit 10b.

If the processor 145 determines feedstock T2 could not be supplied (step S189: No), the processor 145 outputs to the output unit 142 a signal for indicating the sub supply unit 10b was unable to supply feedstock, for example, and ends the process.

Figure 7:
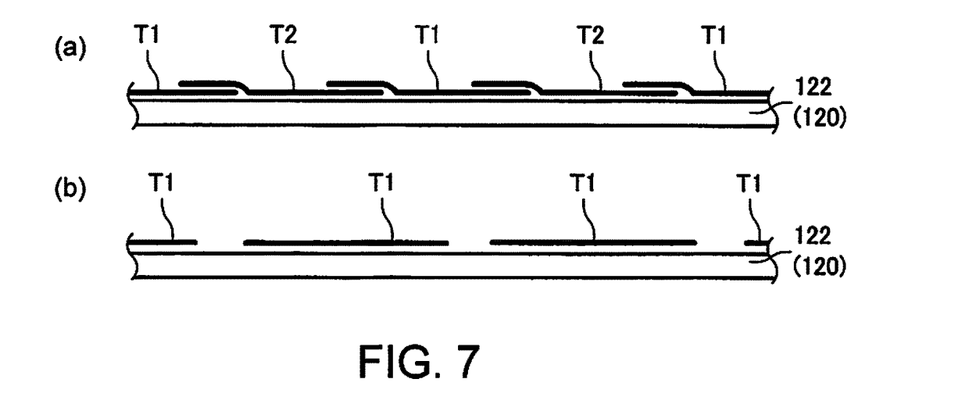
FIG. 7 describes used paper and feedstock that is conveyed.

With the third control process, used paper T1 and feedstock T2 are alternately supplied by repeating the route of N=1 and the route of N=2. In the case of N=3 and N=4, material is supplied from one of supply units 10a, 10b. For example, if supply is from only the main supply unit 10a, the feedstock is supplied with a gap between the sheets of used paper T1 as shown in FIG. 7(b). This is how a conventional sheet manufacturing apparatus works because feedstock is supplied from only one supply unit. In this case, there is a gap in which paper is not supplied between sheets of used paper T1. This creates a space where nothing is supplied, and results in variation in the supplied amount. However, if the first interval M1 is shorter than the length of the used paper T1 or feedstock T2 in the conveyance direction, the used paper T1 and feedstock T2 will overlap in part as shown in FIG. 7(a). While not shown in the figures, if the first interval M1 is the same as the length of the used paper T1 or feedstock T2 in the conveyance direction, the used paper T1 and feedstock T2 will not overlap and a gap will not be formed. In either case, variation in the amount of feedstock material T supplied to the shredder 12 can be reduced compared with supplying used paper T1 from only one supply unit. For example, if the used paper T1 is supplied from one supply unit with a shorter gap between sheets, paper jams can occur easily. As a result, used paper T1 is supplied at a second interval M2 creating a gap between sheets. Furthermore, because the third control process supplies the used paper T1 and feedstock T2 overlapping in part, a gap between sheets is prevented from forming even if the positions of the used paper T1 and feedstock T2 vary.

Note that the first interval M1 and second interval M2 are the distance (the shortest distance between sheets of the two feedstocks assuming the first feedstock and the second feedstock are supplied horizontally) between a first feedstock and a second feedstock supplied after the first feedstock when feedstock material T (used paper T1 or feedstock T2) is supplied continuously from the supply unit to the shredder 12. Note that the first interval M1 and second interval M2 are described here as distance, but may be a time interval instead. In addition, first interval M1<second interval M2.

The supply rate of the feedstock material T supplied to the shredder 12 is faster in the third control process than when feedstock is supplied from only one supply unit. In addition, because the supply units 10a, 10b are alternately driven, the load on the supply units 10a, 10b can be reduced. Because of these effects, the third control process enables also loading used paper T1 in the sub supply unit 10b instead of using used paper T1 and feedstock T2.

Note also that the used paper T1 and feedstock T2 may be supplied without overlapping in part. This also enables reducing the gap between successive sheets of feedstock material T, and reducing variation in the amount of feedstock material T supplied to the shredder 12, compared with supplying from only one supply unit. The supply rate of feedstock material T to the shredder 12 can also be increased, and the process volume per unit of time can be increased. The load on the supply units 10a, 10b can also be further reduced.

Because the third control process does not use sensors 135, 136, 137, 138, these sensors may be omitted.

Some features of the sheet manufacturing apparatus 100 are described below.

The sheet manufacturing apparatus 100 has a manufacturing unit 102 that makes a sheet S, plural supply units 10 that supply loaded feedstock material T to the manufacturing unit 102, and conveys feedstock material T supplied from the multiple supply units 10 with the feedstock material T overlapping. As a result, when two sheets of used paper T1 are overlapping in the sheet manufacturing apparatus 100, the whiteness of one of the overlapping sheets of used paper T1 is low, and the whiteness of one of the overlapping sheets of used paper T1 is high, the whiteness is averaged. This is not limited to whiteness, and also applies to other feedstock characteristics. Compared with a configuration that supplies used paper T1 from only one supply unit, the sheet manufacturing apparatus 100 can therefore reduce the effect of the used paper T1 on the sheet S that is manufactured. As a result, the sheet manufacturing apparatus 100 can suppress variation in the characteristics of the manufactured sheet S resulting from the characteristics of the used paper T1 that is supplied.

Furthermore, because the sheet manufacturing apparatus 100 conveys feedstock material T supplied from plural supply units 10 to the shredder 12 with the feedstock material T overlapping, sheets S can be manufactured with less variation in characteristics than when the feedstock material T is conveyed without overlapping. Furthermore, because the sheet manufacturing apparatus 100 conveys feedstock material T supplied from plural supply units 10 to the shredder 12 with the feedstock material T overlapping, there is no need for multiple shredders 12 even if there are multiple supply units 10. Increasing the parts count of the sheet manufacturing apparatus 100 can therefore be suppressed.

The sheet manufacturing apparatus 100 has a control unit 140 that controls supply from the supply unit 10 so that the feedstock material T overlaps in part. By the control unit 140 controlling supply from the supply unit 10, the sheet manufacturing apparatus 100 can manufacture sheets S with little variation in characteristics.

The sheet manufacturing apparatus 100 conveys used paper T1 supplied from the main supply unit 10a overlapping feedstock T2 supplied from the sub supply unit 10b. The feedstock T2 is a predetermined feedstock, and is suitable as feedstock for the sheet S to be made. The feedstock T2 has, for example, greater whiteness, a longer fiber length, grammage close to the sheet to be made, and less foreign matter than typical used paper. As a result, by conveying the used paper T1 and feedstock T2 overlapping each other, the sheet manufacturing apparatus 100 can more reliably suppress the effect on the sheet S being made even if the supplied used paper T1 has lower whiteness, a shorter fiber length, grammage noticeably different than the sheet S being made, or contains more foreign matter. Using cut-sheet media as the feedstock T2, supply can be controlled more easily quantitatively. Supplying a specific amount is more difficult if the feedstock is fiber, for example.

The sheet manufacturing apparatus 100 has a control unit 140 that supplies feedstock T2 from the sub supply unit 10b selectively according to the used paper T1. For example, feedstock T2 is supplied if the characteristics of the used paper T1 influence the sheet that is made, and feedstock T2 is not supplied if the characteristics of the used paper T1 will not affect the sheet being made. The frequency of using feedstock T2 can therefore be reduced.

The volume of feedstock T2 that can be loaded in the sub supply unit 10b of the sheet manufacturing apparatus 100 is less than the volume of used paper T1 that can be stored in the main supply unit 10a. Because the feedstock T2 is material for manufacturing sheets, a low cost is preferable for the user. The cost can be reduced by reducing the amount of feedstock T2 and reducing the size and thickness of the feedstock T2.

The sub supply unit 10b is located above the main supply unit 10a in the sheet manufacturing apparatus 100. Because the main supply unit 10a can hold more feedstock material T in the sheet manufacturing apparatus 100, the sub supply unit 10b will be hidden by the main supply unit 10a and more difficult to load if the sub supply unit 10b is located below the main supply unit 10a. Loading the sub supply unit 10b is therefore made easier by disposing the sub supply unit 10b above the main supply unit 10a. Furthermore, because the user loads more used paper T1 in the main supply unit 10a, a lower position makes loading the used paper T1 less tiresome.

Furthermore, because the sub supply unit 10b is located above the main supply unit 10a in the sheet manufacturing apparatus 100, aligning the width (the size in the direction crosswise to the conveyance direction of the used paper T1 and feedstock T2) of used paper T1 and feedstock T2 that overlap in the guide unit 120, for example, is simple. More specifically, if the used paper T1 and feedstock T2 are the same width, the used paper T1 and feedstock T2 can be supplied to the shredder 12 aligned widthwise. As a result, the sheet manufacturing apparatus 100 can manufacture sheets S with less variation in characteristics.

Note that when there are differences in the size of the used paper T1 and feedstock T2, or manufacturing variations in the guide unit 120, for example, the sheet manufacturing apparatus 100 can supply used paper T1 and feedstock T2 aligned widthwise within the range of these differences to the shredder 12.

A sheet manufacturing method that uses the sheet manufacturing apparatus 100 includes a step of overlapping and conveying feedstock material T supplied from multiple supply units 10, and a step of making a sheet using the feedstock material T. As a result, a sheet manufacturing method that uses the sheet manufacturing apparatus 100 can suppress variation in the characteristics of the sheets S that are made.

2. Other Examples of a Sheet Manufacturing Apparatus

Figure 8:
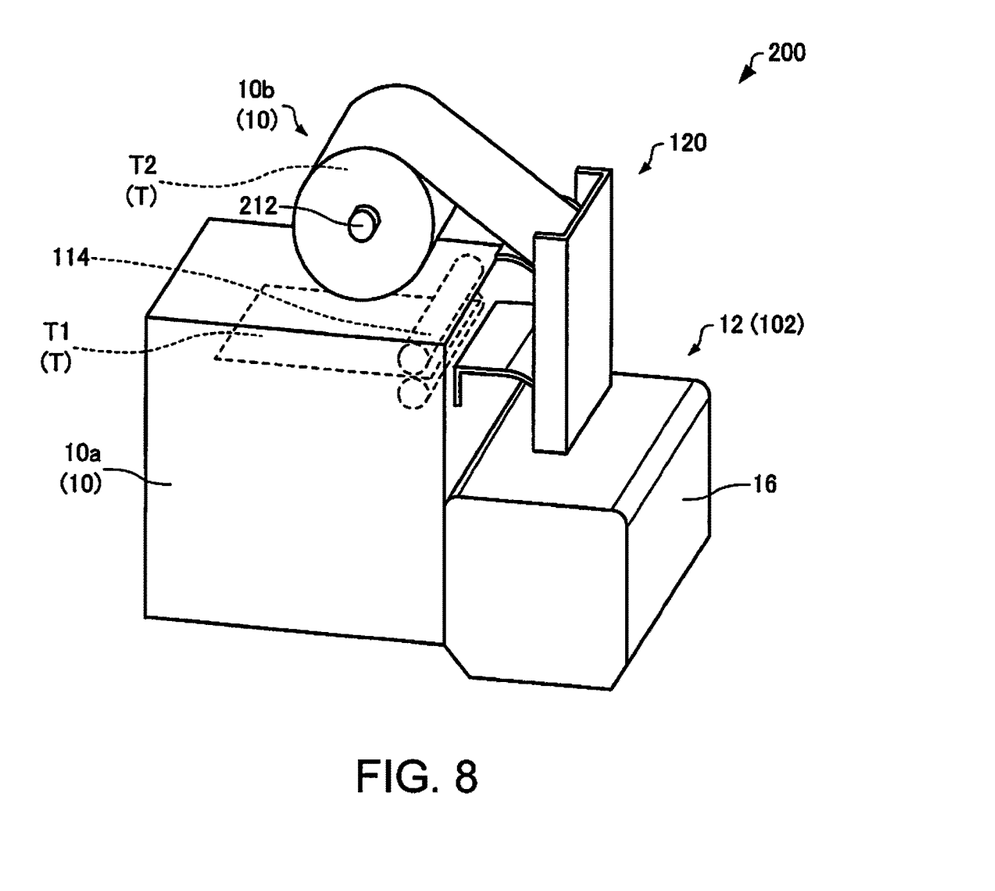
FIG. 8 is an oblique view schematically illustrating the supply unit, guide unit, and shredder of a sheet manufacturing apparatus according to another embodiment of the invention.

A sheet manufacturing apparatus 200 according to another embodiment of the invention is described below. FIG. 8 is an oblique view of a sheet manufacturing apparatus 200 according to this embodiment. Note that differences between this sheet manufacturing apparatus 200 and the sheet manufacturing apparatus 100 described above are described below, and further description of similarities is omitted.

As shown in FIG. 2 and FIG. 3, the feedstock T2 supplied by the sub supply unit 10b in the sheet manufacturing apparatus 100 described above is cut sheets. As shown in FIG. 8, the feedstock T2 supplied by the sub supply unit 10b in this sheet manufacturing apparatus 200 is roll paper. The sub supply unit 10b of the sheet manufacturing apparatus 200 has a spindle 212 that is the center of rotation of the paper roll.

The sub supply unit 10b of this sheet manufacturing apparatus 200 is lighter than in the sheet manufacturing apparatus 100 described above.

Note that the feedstock material T supplied from the multiple supply units 10 in the foregoing example overlaps and is conveyed in the guide unit 120, but the time when the multiple supply units 10 are driven (such as the time the feed roller 114 is driven) may overlap even if the feedstock does not overlap in the guide unit 120. More specifically, when feedstock is supplied from one supply unit 10, feedstock is also supplied from another supply unit.

The feedstock material T supplied from multiple supply units 10 in the foregoing examples is conveyed to one shredder 12, but the sheet manufacturing apparatus 100 according to the invention may have multiple shredders 12 corresponding to the multiple supply units 10, and the shreds (pieces) may be mixed after shredding by the shredders 12.

A dry process sheet manufacturing apparatus is described above, but the sheet manufacturing apparatus of the invention may also be used in a wet process. For example, a grinder (pulper) may be used instead of the defibrating unit 20, a de-inker used instead of the classifier 30, and a slurry screener used instead of the sheet forming unit 80.

Sheets S manufactured by this sheet manufacturing apparatus point primarily to products in the form of a sheet. The invention is not limited to making sheets, however, and may make paperboard and web forms. Sheets as referred to herein are separated into paper and nonwoven cloth. Paper includes products formed into thin sheets from pulp or used paper as the feedstock, and includes recording paper for handwriting and printing, wall paper, packaging paper, color paper, drawing paper, and bristol paper, for example. Nonwoven cloth includes products that are thicker or have lower strength than paper, and includes common nonwoven cloth, fiberboard, tissue paper (tissue paper for cleaning), kitchen paper, cleaning paper, filter paper, liquid (waste ink, oil)

absorption materials, sound absorbers, heat insulation, cushioning materials, and mats, for example. The feedstock may also be cellulose or other type of plant fiber, synthetic fiber such as PET (polyethylene terephthalate) and polyester, or wool, silk, or other animal fiber.

The invention may be configured to omit some of the configurations described above insofar as the features and effects described above are retained, and may combine aspects of different embodiments and examples.

The invention includes configurations that are effectively the same as the configurations described above (configurations of the same function, method, and result, or configurations of the same objective and effect). The invention also includes configurations that replace parts that are not essential to the configuration described in the foregoing embodiment. Furthermore, the invention includes configurations having the same operating effect, or configurations that can achieve the same objective, as configurations described in the foregoing embodiment. Furthermore, the invention includes configurations that add technology known from the literature to configurations described in the foregoing embodiment.

REFERENCE SIGNS LIST 1 conduit
2 hopper
3, 4, 5 conduit
6 hopper
7, 8 conduit
9 hopper
10 supply unit
10a main supply unit
10b sub supply unit
12 shredder
14 shredder blades
16 case
20 defibrating unit
22 inlet
24 exit
30 classifier
31 inlet
32 cylinder
33 conical section
34 bottom discharge port
35 top discharge port
36 receiver
40 separator
42 inlet
44 exit
50 mixing unit
52 additive supply unit
54 conduit
56 blower
60 air-laying unit
62 inlet
70 web forming unit
72 mesh belt
74 tension rollers
76 suction mechanism
78 moisture content adjustment unit
80 sheet forming unit
82 first binding unit
84 second binding unit
86 heat rollers
90 cutting unit
92 first cutter
94 second cutter
96 discharge unit
98 marking unit
100 sheet manufacturing apparatus
102 manufacturing unit
110 loading tray
112 vertical drive shaft
113 pickup roller
114 feed roller
116 case
118 exit
120 guide unit
122 flat panel
124 first guide
126 second guide
131 first sensor
132 second sensor
133 third sensor
134 fourth sensor
135 fifth sensor
136 sixth sensor
137 seventh sensor
138 eighth sensor
140 control unit
141 operating unit
142 output unit
143 storage unit
144 storage medium
145 processor
200 sheet manufacturing apparatus
212 spindle

The invention claimed is:

1. A sheet manufacturing apparatus comprising:
a manufacturing unit that makes a sheet; and
a plurality of supply units that supply loaded feedstock to the manufacturing unit, the plurality of supply units including
a first supply unit that supplies used paper to the manufacturing unit, and
a second supply unit that supplies a predetermined feedstock to the manufacturing unit.

2. The sheet manufacturing apparatus according to claim 1, further comprising a control unit that controls supplying from the first and second supply units so that the used paper from the first supply unit and the predetermined feedstock supplied from the second supply unit partially overlap.

3. The sheet manufacturing apparatus according to claim 2, further comprising a guide unit that conveys the used paper supplied from the first supply unit and the predetermined feedstock supplied from the second supply unit which overlap each other.

4. The sheet manufacturing apparatus according to claim 1, further comprising a control unit that supplies from the second supply unit selectively according to the used paper.

5. The sheet manufacturing apparatus according to claim 1, wherein the amount of the predetermined feedstock that is configured to be loaded in the second supply unit is less than the amount of used paper that is configured to be loaded in the first supply unit.

6. The sheet manufacturing apparatus according to claim 5, wherein the second supply unit is disposed above the first supply unit.

7. A sheet manufacturing method comprising:
supplying used paper from a first supply unit;
supplying a predetermined feedstock from a second supply unit, and conveying the used paper supplied from the first supply unit and the predetermined feedstock supplied from the second supply unit, which overlap each other; and manufacturing a sheet using the used paper and the predetermined feedstock.

8. A sheet manufacturing apparatus comprising:

a manufacturing unit that makes a sheet; and a plurality of supply units including a first supply unit that supplies used papers to the manufacturing unit, and a second supply unit that supplies predetermined feedstocks to the manufacturing unit, and the first supply unit and the second supply unit alternately supplying the used papers and the predetermined feedstocks.

9. A sheet manufacturing apparatus comprising:

a manufacturing unit that makes a sheet; and a plurality of supply units including a first supply unit that supplies used caper to the manufacturing unit, and a second supply unit that supplies a predetermined feedstock to the manufacturing unit, while the first supply unit is supplying the used paper to the manufacturing unit, the second supply unit is supplying the predetermined feedstock to the manufacturing unit.

10. The sheet manufacturing apparatus according to claim 1, further comprising a control unit that controls supplying from the first and second supply units, in response to determining that the supplying from one supply unit of the first and second supply units is not performed, the control unit controlling a different supply unit of the first and second supply units, which is different from the one supply unit, to continue the supplying.

11. The sheet manufacturing apparatus according to claim 1, wherein:

the manufacturing unit has a shredder that shreds the used paper supplied by the first supply unit and the predetermined feedstock supplied by the second supply unit; and the first supply unit and the second supply unit supply the used paper and the predetermined feedstock to the shredder.

12. The sheet manufacturing apparatus according to claim 8, wherein:

the first supply unit supplies the used papers by a quantity unit, the second supply unit supplies the predetermined feedstocks by a different quantity unit that is different from the quantity unit, and the first and second supply units alternately supply the used papers with the quantity unit and the predetermined feedstocks with the different quantity unit.

13. The sheet manufacturing apparatus according to claim 1, wherein:

the first supply unit is a main supply unit and the second supply unit is a sub supply unit.

14. The sheet manufacturing apparatus according to claim 1, wherein:

the second supply unit is disposed above the first supply unit.

* * * * *